Jan. 23, 1934.                C. M. FAIRLEY                 1,944,503
                                FISHING ROD
                             Filed June 27, 1932
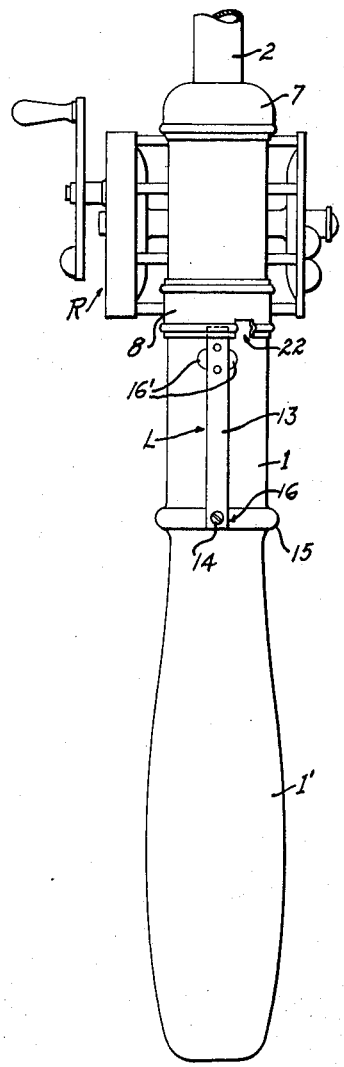
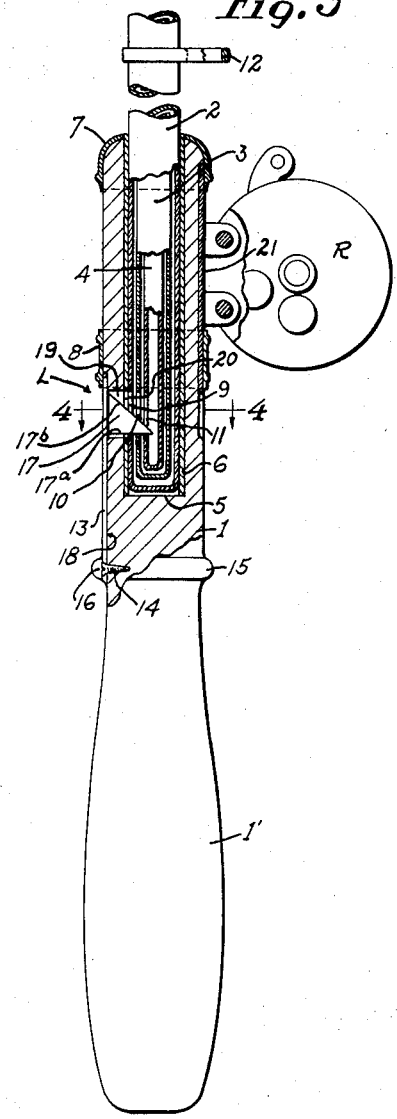
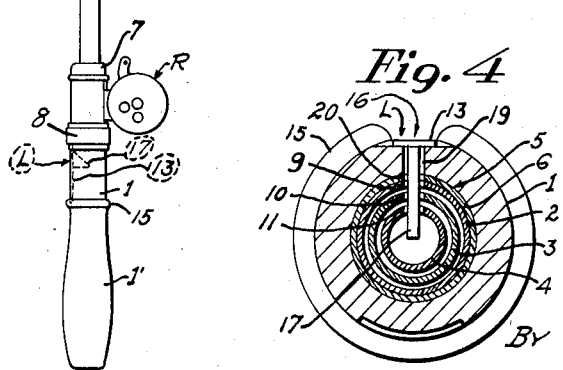
INVENTOR
C. M. FAIRLEY
BY E. M. Harrington
ATTORNEY Patented Jan. 23, 1934

1,944,503

UNITED STATES PATENT OFFICE 1,944,503

FISHING ROD

Charles M. Fairley, St. Louis, Mo.

Application June 27, 1932. Serial No. 619,399

9 Claims. (Cl. 43—18)

This invention relates generally to fishing rods and more specifically to fishing rods of the telescoping type, the predominant object of the invention being to provide a fishing rod of this sort which includes means for locking the telescoping rod sections in their retracted positions so that the rod might be adjusted to various fixed lengths for use under different conditions and in various situations.

It is quite well known to persons familiar with the use of fishing rods that under various fishing conditions rods of different lengths are required. For instance, in many situations full length fishing rods are required for efficient results, while in other situations rods of reduced length should be used. Also when the type of fishing being indulged in is what is known as bait casting a very short rod is used. Heretofore it has been necessary for a sportsman who really desired to be properly equipped to enjoy the sport of fishing to be provided with fishing rods of various lengths, and also for bait casting such sportsman had to be supplied with the short rod ordinarily used for this purpose.

In view of the foregoing I have devised the improved fishing rod disclosed herein which, briefly stated, comprises a handle portion with which is associated a plurality of telescopic rod sections. The improved rod includes locking means which preferably, though not necessarily, is associated with the handle portion of the rod and functions in a manner to lock the various telescoping rod sections in their retracted positions. Because of this arrangement all of the rod sections may be drawn outwardly to their extended positions to provide a full length rod, or all of the rod sections may be moved to their retracted positions and locked in such positions to provide a very short rod capable of use in bait casting. Furthermore certain of the rod sections might be extended and another thereof locked in its retracted position to provide a rod of intermediate length.

By providing the improved rod disclosed herein the necessity that a fisherman be supplied with rods of various lengths is eliminated as a single rod constructed in accordance with this invention will supply rods of the various lengths ordinarily required.

Figure 1 is a view of the improved fishing rod showing same in its fully extended condition.

Figure 2 is an enlarged plan view of the handle portion of the rod.

Figure 3 is a view of the handle portion shown in Figure 2 but showing a portion thereof in section to illustrate the locking mechanism of the improved rod.

Figure 4 is a cross section on line 4—4 of Figure 3.

In the drawing, wherein is shown for the purpose of illustration, merely, one embodiment of the invention, A designates the improved fishing rod generally, said rod comprising a handle portion 1 and a plurality of rod sections 2, 3, and 4 which are arranged in telescopic relation. The handle portion is provided with a gripping portion 1', and forwardly of said gripping portion said handle portion is provided with a cavity 5 which preferably is provided with a cylindrical liner 6. At its inner end the handle portion is provided with a ferrule 7, and slidingly arranged on said handle portion is an annular element 8 which serves a purpose to be hereinafter set forth.

The inner end portion of the rod section 2 is extended into the cavity 5 of the handle portion 1 as shown clearly in Figure 3 so as to cooperatively associate the telescopic rod sections 2, 3, and 4 with said handle portion, and, as is quite obvious, the rod sections may be moved to their extended positions as shown in Figure 1 or to their retracted positions as illustrated in Figure 3. At the outer ends of the rod sections 2 and 3 portions 2' and 3' of slightly reduced diameter are provided. These portions are adapted to frictionally grip the inner portions of the rod sections 3 and 4, which are of slightly increased diameter, when said rod sections are in their extended positions and thereby retain said rod sections in said extended positions.

Adjacent to its inner end each of the rod sections 2, 3, and 4 is provided with an opening which is formed through the wall thereof, said openings being designated in the drawing by the reference characters 9, 10, and 11 respectively. The inner ends of the rod sections 2, 3, and 4 may be shaped as shown in Figure 3 and provided with the openings referred to, or, if preferred, said inner ends of said rod sections may be in the form of separate elements suitably secured to said rod sections. The rod sections 2, 3, and 4 are provided with suitable guiding elements 12 for the fishing line and when the eyes of these guiding elements are arranged in alinement relative to each other and with respect to the reel R the openings 9, 10, and 11 will be in registration as shown in Figure 3.

Associated with the handle portion of the improved fishing rod is locking device L which comprises a leaf spring 13 which is secured at one of its ends to the handle portion 1 of the rod by suitable fastening means 14, the annular rib 15 of said handle portion being notched as indicated at 16 to receive the attached end portion of the leaf spring 13. Rigidly fixed to the leaf spring 13 at the end thereof opposite to the end which is attached to the handle portion of the rod is a locking element 17. The handle portion 1 is provided with a groove 18 in which the leaf spring 13 is arranged and also said handle portion is provided with cutout portions 16' adjacent to the free end of the leaf spring which permit said leaf spring to be raised by inserting the finger nails beneath same. The locking element 17 passes through an opening 19 formed through a portion of the handle 1, said opening 19 being in communication with a similar opening 20 formed through the wall of the cylindrical liner 6 and with the openings 9, 10, and 11 formed at the inner ends of the telescopic rod sections 2, 3, and 4 when the rod sections 3 and 4 are in their retracted positions. The locking element 17 is provided with a locking face 17$^a$ and an inclined cam face 17$^b$.

If desired the improved fishing rod disclosed herein may be provided with a reel of ordinary construction such as the reel designated by the reference character R in the drawing. This reel includes a plate 21 which is extended longitudinally of the handle portion 1 of the rod, said plate being curved slightly transversely to correspond to the curvature of the handle portion and an end portion of said plate being extended beneath the furrule 7 as shown in Figure 3. The opposite end portion of the plate 21 is secured in place by the annular element 8 already referred to herein, said annular element being moved in a direction toward the outer end of the handle portion 1 so as to permit the plate 21 to be arranged in contact with said handle portion whereupon said annular element is moved along the handle portion of the rod in the opposite direction so as to embrace the adjacent end portion of the plate and thereby fasten same to said handle portion.

In addition to serving as a fastening device for the reel R the annular element 8 acts as a means for retaining the leaf spring 13 of the locking device L in a depressed position, said annular element being arranged to overlap the free end portion of said leaf spring as shown in Figures 2 and 3 so as to prevent accidental outward movement thereof. In order to permit the free end portion of the leaf spring to be moved outwardly when desired I provide the annular element 8 with a notch 22 which may be moved, by rotating the annular element, to a position where said notch is alined with the free end of the leaf spring, whereupon said free end of said leaf spring may be moved outwardly without hinderance from the annular element.

In the use of my improved fishing rod the portion thereof made up of the telescopic sections 2, 3, and 4 is applied to the handle portion 1 of said fishing rod by inserting the inner end portion of the rod section 2 into the cavity 5 formed within said handle portion. When being introduced in place in the cavity 5 the entering end of the rod section 2 will contact with the inclined face 17$^b$ of the locking element 17 whereby said locking element will be cammed outwardly, the leaf spring yielding and moving outwardly because the notch 22 of the annular element 8 was previously alined with the free end portion of said leaf spring. When the inner end portion of the rod section 2 has been seated in the cavity 5 the locking element 17 will be extended through the opening 9 formed adjacent to the inner end of said rod section with the result that the locking face 17$^a$ of the locking element 17 will lock said rod section in place. In like manner as the rod sections 3 and 4 are moved inwardly to their retracted positions the inner ends of said rod sections will contact with the inclined face 17$^b$ of the locking element so as to cam said locking element outwardly and when said rod sections have reached their retracted positions the locking element enters the openings 10 and 11 of said rod sections 3 and 4 to lock same in such retracted positions. Because of the arrangement just described the improved rod may be employed for bait casting at which time all of the rod sections will be locked in their retracted positions as shown in Figure 3. Also when a rod of intermediate length is required the rod section 3 may be locked in its retracted position with the rod section 4 in its extended position. Furthermore it is obvious that all of the rod sections may be arranged in extended positions as shown in Figure 1 when a full length rod is desired.

In addition to the arrangement of providing rods of different length as already explained an important feature of the invention is that the portion of the rod made up of the telescopic rod sections may be disconnected from the handle portion 1 so as to greatly reduce the dimensions of the collapsed rod and permit same to be carried in a relatively small receptacle.

While I have illustrated and described a fishing rod which includes three telescopic rod sections it is to be understood that the invention is not limited to a rod of this precise arrangement, as my improved fishing rod may include a greater or less number of telescopic rod sections than described and illustrated herein.

I claim:

1. A fishing rod comprising a handle portion, a plurality of rod sections arranged in telescopic relation and movable to extended and retracted positions, and locking means supported by said handle portion for locking said telescopic rod sections to said handle portion in their retracted positions, said locking means comprising a yieldable member fixed at one end to said handle element, and a locking element at the opposite movable end of said yieldable member, said locking element being adapted to engage said telescopic rod sections to lock same in place.

2. A fishing rod comprising a handle portion, a plurality of rod sections arranged in telescopic relation and movable to extended and retracted positions, and locking means supported by said handle portion for locking said telescopic rod sections to said handle portion in their retracted positions, said locking means comprising a yieldable member fixed at one end to said handle element, and a locking element at the opposite movable end of said yieldable member, said locking element having a cam face with which portions of said telescopic rod sections contact to displace said locking element when the telescopic rod sections are being moved to their retracted positions, and said locking element being adapted to engage said telescopic rod sections to lock same in place.

3. A fishing rod comprising a handle portion, a plurality of rod sections arranged in telescopic relation and movable to extended and retracted positions, and locking means supported by said handle portion for locking said telescopic rod sections to said handle portion in their retracted positions, said locking means comprising a yieldable member fixed at one end of said handle element, and a locking element at the opposite movable end of said yieldable member, said locking element being adapted to be extended into openings formed in said telescopic rod sections to lock same in place.

4. A fishing rod comprising a handle portion, a plurality of rod sections arranged in telescopic relation certain of which are movable to extended and retracted positions, locking means supported by said handle portion for locking said telescopic rod sections to said handle portion, said locking means comprising a leaf spring fixed at one end to said handle portion, and a locking element at the opposite movable end of said leaf spring, said locking element being adapted to engage said telescopic rod sections to lock same in place, and means for securing said locking means in its locking position.

5. A fishing rod comprising a handle portion, a plurality of rod sections arranged in telescopic relation certain of which are movable to extended and retracted positions, locking means supported by said handle portion for locking said telescopic rod sections to said handle portion, said locking means comprising a leaf spring fixed at one end to said handle portion, and a locking element at the opposite movable end of said leaf spring, said locking element being adapted to engage said telescopic rod sections to lock same in place, and means for securing said locking means in its locking position, said means comprising an annular element movable to a position where it engages the free end of said leaf spring.

6. A fishing rod comprising a handle portion, a plurality of rod sections arranged in telescopic relation certain of which are movable to extended and retracted positions, locking means supported by said handle portion for locking said telescopic rod sections to said handle portion, said locking means comprising a leaf spring fixed at one end to said handle portion, and a locking element at the opposite movable end of said leaf spring, said locking element being adapted to engage said telescopic rod sections to lock same in place, and means for securing said locking means in its locking position, said means comprising an annular element movable to a position where it engages the free end of said leaf spring, and said annular element being provided with a notch movable into and out of registration with the free end of said leaf spring so as to render said leaf spring capable or incapable of movement.

7. A fishing rod comprising a handle portion, a plurality of rod sections arranged in telescopic relation and movable to extended and retracted positions, and a common locking means for locking all of said telescopic rod sections to said handle portion in their retracted positions, said locking means being attached to said handle portion and being movable to positions where said telescopic rod sections are in locked or unlocked relation with respect to said handle portion.

8. A fishing rod comprising a handle portion, a plurality of rod sections arranged in telescopic relation and movable to extended and retracted positions, and a common and manually releasable locking means for locking all of said telescopic rod sections to said handle portion in their retracted positions, said locking means being attached to said handle portion and being movable to positions where said telescopic rod sections are in locked or unlocked relation with respect to said handle portion.

9. A fishing rod comprising a handle portion and a rod portion composed of a plurality of rod sections arranged in telescopic relation, and locking means attached to said handle portion and movable to locking and unlocked positions, said locking means when in its locked position serving to secure the rod portion to the handle portion of the fishing rod, and when in its unlocked position permitting complete detachment of the entire rod portion from the handle portion.

CHARLES M. FAIRLEY.